United States Patent [19]
Brunner

[11] Patent Number: 5,556,221
[45] Date of Patent: Sep. 17, 1996

[54] FASTENING DEVICE FOR BARS OF A ROOF RACK

[75] Inventor: Harald Brunner, Solingen, Germany

[73] Assignee: Happich Fahrzeug-Dachsysteme GmbH, Germany

[21] Appl. No.: 423,007

[22] Filed: Apr. 14, 1995

[30] Foreign Application Priority Data

May 9, 1994 [DE] Germany .......................... 44 16 339.8

[51] Int. Cl.$^6$ ........................................................ F16B 2/02
[52] U.S. Cl. .......................... 403/322; 403/321; 403/188; 403/384; 224/321; 224/326
[58] Field of Search ................................. 224/309, 315, 224/321, 325, 326, 329, 331; 24/494; 248/510; 403/384, 385, 321, 322, 49, 180, 181, 373, 405.1, 406.1, 338, DIG. 9, 188

[56] References Cited

U.S. PATENT DOCUMENTS

| | | | |
|---|---|---|---|
| 2,447,199 | 8/1948 | Miller | 24/494 X |
| 4,496,089 | 1/1988 | Elund | 224/329 |
| 5,275,320 | 1/1994 | Duemmler | 224/321 X |
| 5,366,128 | 11/1994 | Grim | 224/329 X |
| 5,385,285 | 1/1995 | Cucheran et al. | 224/326 X |
| 5,419,479 | 5/1995 | Evels et al. | 224/309 X |

FOREIGN PATENT DOCUMENTS

| | | | |
|---|---|---|---|
| 193501 | 9/1986 | European Pat. Off. | 224/309 |
| 690148 | 4/1953 | Germany | 224/331 |
| 3619673 | 7/1987 | Germany | 224/326 |
| 3709335 | 10/1988 | Germany | 224/329 |

*Primary Examiner*—Kenneth J. Dorner
*Assistant Examiner*—Harry C. Kim
*Attorney, Agent, or Firm*—Ostrolenk, Faber, Gerb & Soffen, LLP

[57] ABSTRACT

A fastening device with a rapid clamping mechanism for the fastening of transverse supports to railing bars of a vehicle roof rack. On the transverse support a housing of the fastening device can be fixed. The housing has a fixed clamping jaw which can rest from above on the railing bar. The housing also includes two housing walls which are directed vertically and are spaced from each other, between which a lever mechanism is arranged on pivot pins and on mounting pins which are fixed to the housing. By pivotal motion of a clamping lever of the lever mechanism, a lower clamping jaw of the lever mechanism is moved to enclose the railing bar relative to the fixed clamping jaw. Thus, the railing bar is clamped between the lower clamping jaw and the fixed clamping jaw.

8 Claims, 8 Drawing Sheets

FASTENING DEVICE FOR BARS OF A ROOF RACK

BACKGROUND OF THE INVENTION

The present invention relates generally to a fastening device which can be incorporated on the ends of a transverse support for attachment to railing bars as part of an automobile roof rack.

A fastening device of this general type is known from Federal Republic of Germany Patent No. DE 41 08 058 C1. That fastening device has supporting jaws which lie toward the center of the vehicle and clamping jaws which are located towards the outer side of the vehicle. The clamping jaws are arranged on the transverse support and are displaceable thereon via a clamping screw bolt. By tightening the clamping screw bolts, the displaceable clamping jaws, with the railing bars enclosed between them, are pulled against the supporting jaws and the transverse support is thereby attached to the railing bars. It has been found that the known fastening device does not always satisfy the technical requirements with respect to an optimal transfer of force and that it requires a considerable amount of manipulation to achieve the desired results.

SUMMARY OF THE INVENTION

The object of the present invention is to provide a fastening device of the aforementioned type which permits the attachment of the transverse support to railing bars of any cross-sectional profile, and assures a reliable attachment to the railing bars, and is characterized by rapid and simple handling. The present invention solves this objective in the case of a fastening device of the aforementioned type.

The fastening device of the present invention includes a lever system, which, while requiring a slight closing force, is characterized by an enormous clamping force, and is adapted to be placed on a railing bar of any cross-sectional profile in an extremely rapid and simple manner.

While obtaining a large clamping forces with the expenditure of only a slight amount of force, a further objective of the present invention is to maintain this clamping force as long as necessary.

A further objective of the present invention is to secure the fastening device against unauthorized removal.

Another objective is to secure the transverse support to the railing bar while at the same time, securing the fastening elements held by the transverse support from being pulled off over the ends of the transverse support.

Still another objective is to increase the comfort of operation of the fastening device in properly gripping the railing bars when operating the lever mechanism of the present invention.

A further objective of the present invention is simplicity in manufacture.

Yet another objective is the ease of adjustment of the present invention in clamping it on to a railing bar of any cross-sectional profile.

The present invention is a fastening device adapted to be incorporated as part of a transverse support for attachment to a railing bar of a automobile roof rack. The fastening device includes a housing having a fixed clamping jaw capable of resting on a railing bar, and further includes two housing walls which are spaced from each other. A lever mechanism is mounted between the two housing walls and includes a bell-crank lever pivotally fixed between the two housing walls. A lower clamping jaw, which is part of the lever mechanism, is pivoted about a point thereon, and is disposed opposite the fixed clamping jaw. A series of levers are pivotally connected between the bell-crank lever and the lower clamping jaw. The lower clamping jaw is connected at its pivot point to an adjustment mechanism which is capable of displacing the pivot point of the lower clamping jaw. When the bell-crank lever is actuated, such actuation is translated through the series of levers which causes the lower clamping jaw to pivot about its pivot point and thereby the railing bar is clamped between the fixed clamping jaw and the lower clamping jaw. By displacement of the pivot point of the lower clamping jaw, the spacing between the lower clamping jaw and the fixed clamping jaw is varied so that the fastening device can be clamped to railing bars of various cross-sectional profiles.

Other features and advantages of the present invention will become apparent from the following description of the invention which refers to the accompanying drawings.

BRIEF DESCRIPTION OF THE DRAWINGS

For a fuller understanding of the nature and objectives of the invention, reference should be made to the following detailed description, taken in connection with the accompanying drawings.

DETAILED DESCRIPTION OF EMBODIMENTS OF THE INVENTION

Figure 1:
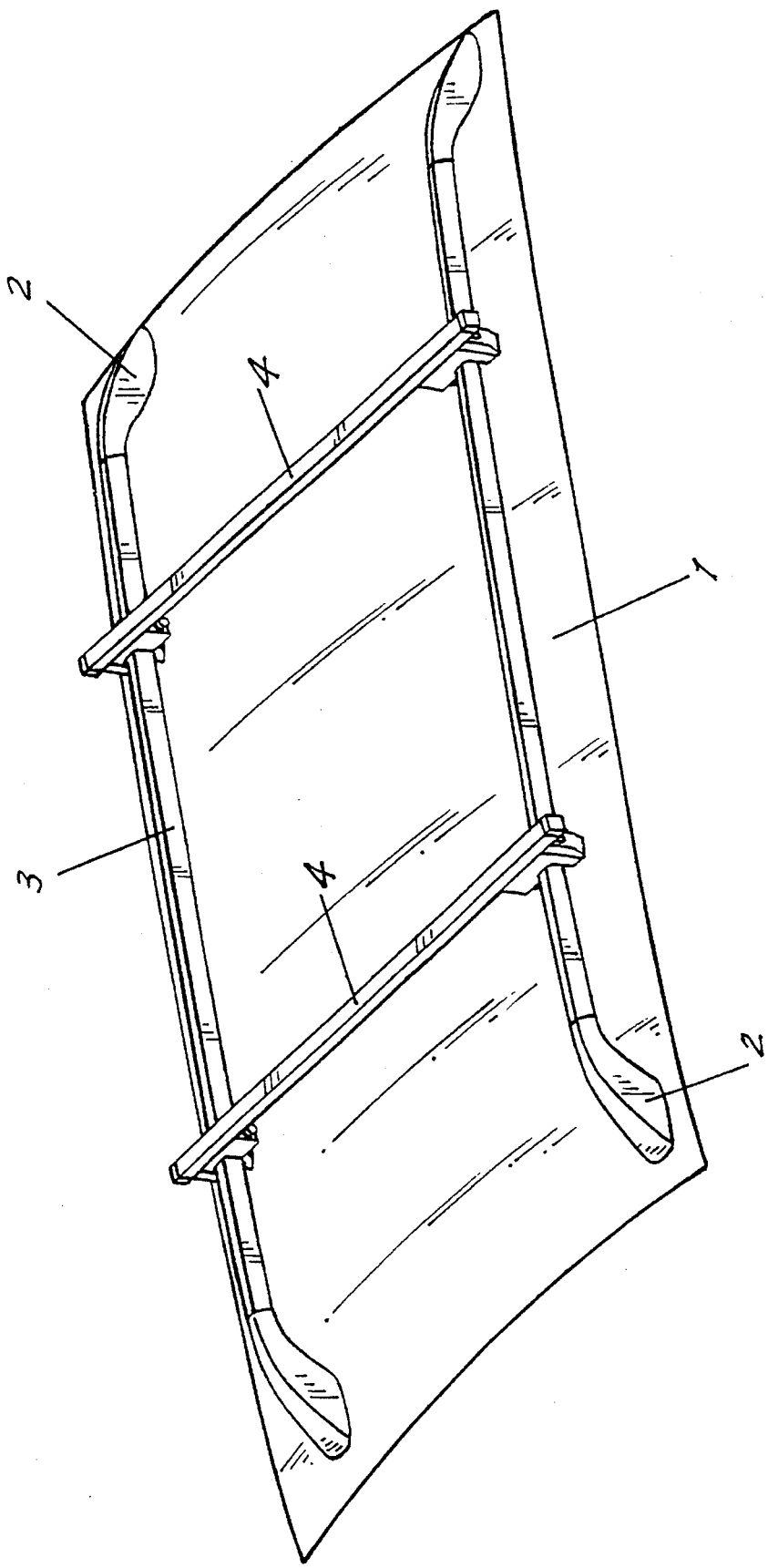
FIG. 1 illustrates a roof railing with transverse supports arranged on the roof of a vehicle.

FIG. 1 shows the roof plate 1 of a vehicle (not further shown) with a roof luggage carrier disposed thereon. The roof luggage carrier is formed of two rails, comprised of support feet 2 and railing bars 3, as well as transverse supports 4 which are fastened to the railing bars 3. The rails extend at least approximately parallel to each other in the longitudinal direction of the vehicle.

The arrangement for fastening the transverse supports 4 on the railing bars 3 and the development of the fastening device for this is now described below.

Figure 6:
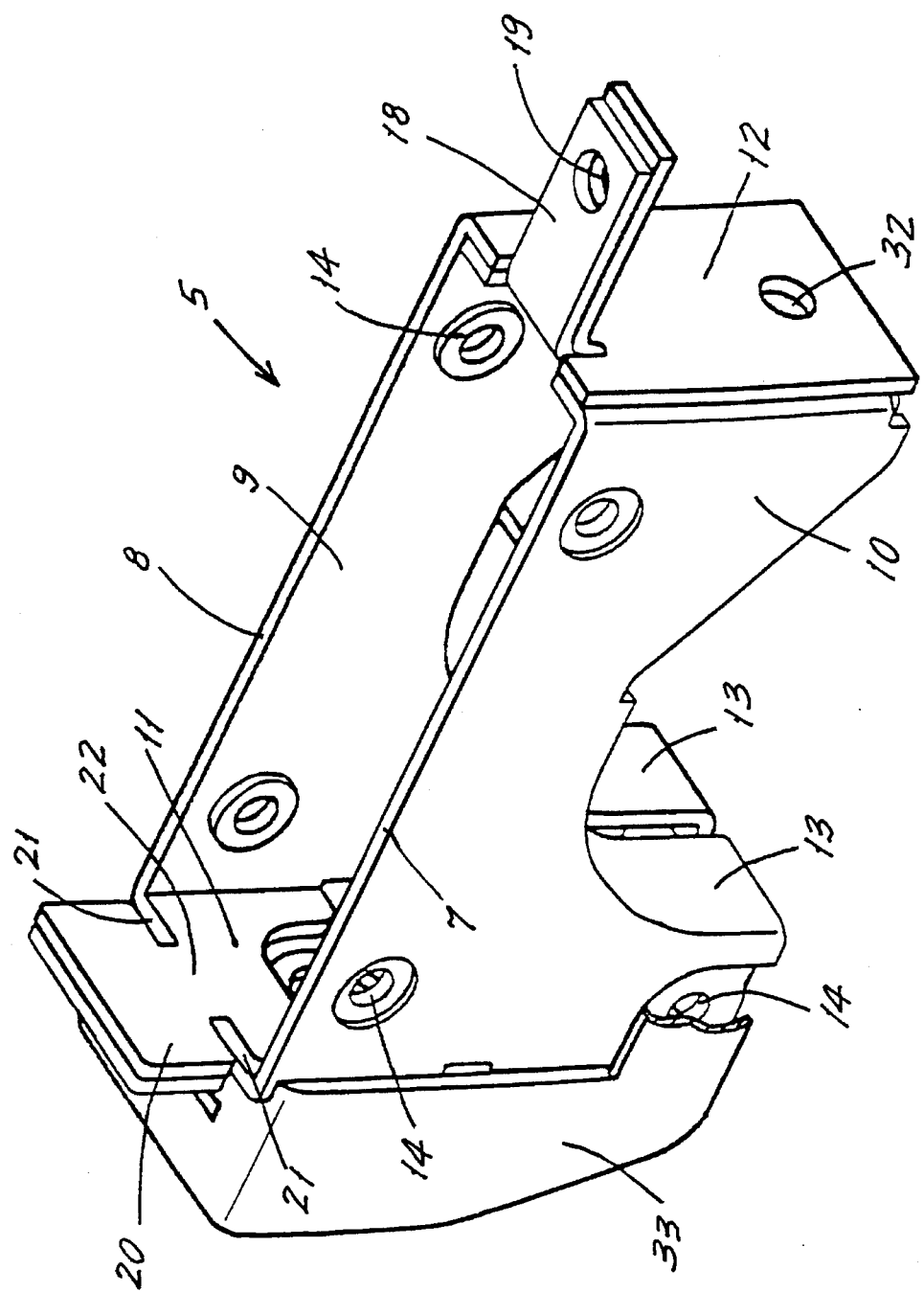
FIG. 6 is a perspective view of the housing of the fastening device as shown in FIG. 2.
Figure 7:
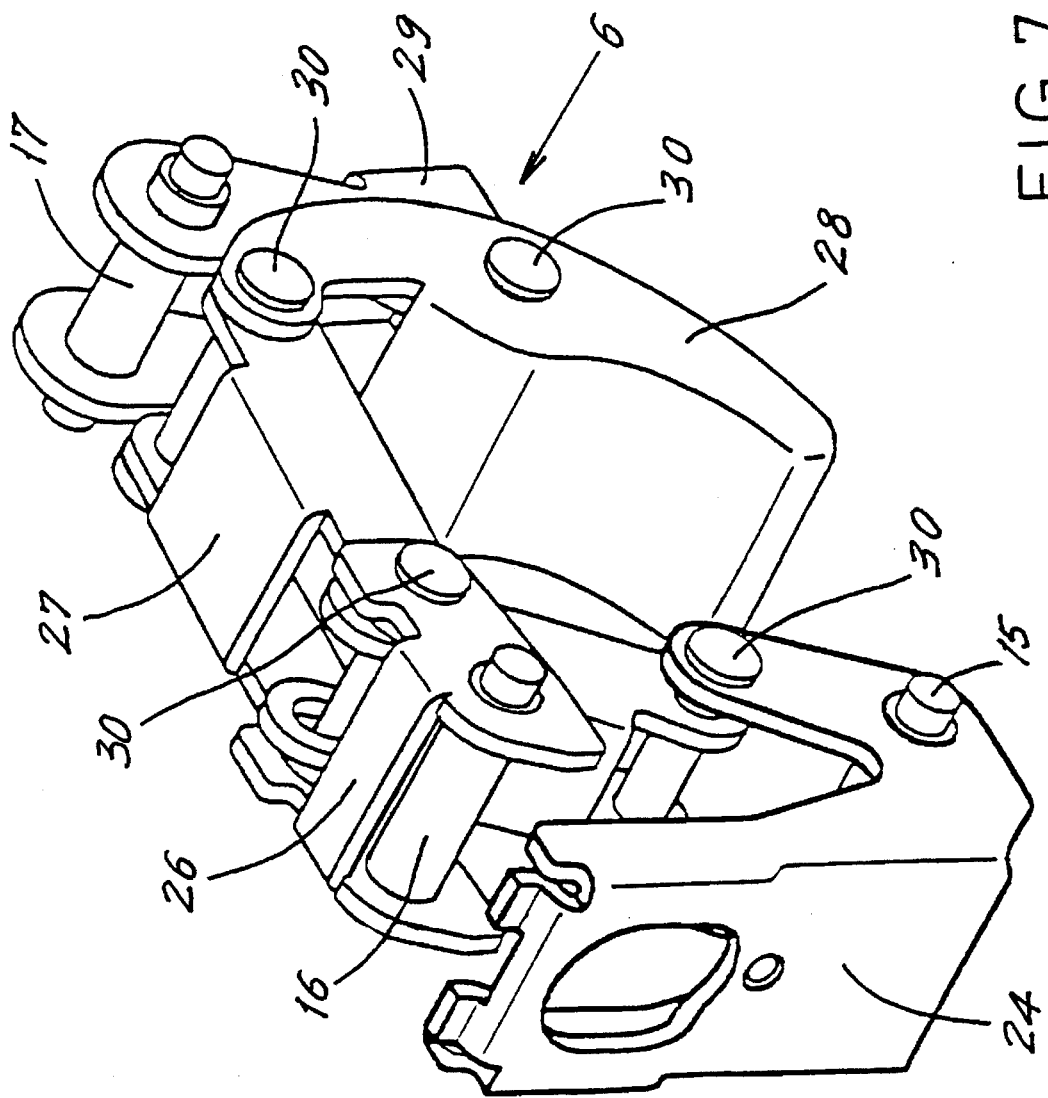
FIG. 7 is a perspective view of the lever mechanism of the fastening device, as shown in FIG. 2.

The fastening device which is arranged on each end region of each transverse support 4 includes of a housing 5, which can be noted in particular from FIG. 6, and a lever mechanism 6 which is received by the housing 5 and is shown particularly in FIG. 7.

The housing 5, which is formed of the housing parts 7, 8, has side walls 9, 10, a front wall 11 and a rear wall 12. The housing 5 which is open on top and in part towards the front and the bottom is provided with regions of material which are drawn inward at the side walls and form with each other a clamping jaw 13 which can rest from above on the railing bar 3. Opposite holes 14 are arranged in the side walls 9, 10 of the housing 5, which serve to receive mounting pins 15, 16, 17 of the lever mechanism 6.

The housing 5 also has an extension 18 which protrudes at a right angle from the housing rear wall 12. A hole 19 extends through extension 18. An extension of the front wall 11 of housing 5 comprises a hammer-head shaped extension 20 having a neck 22 which is formed by lateral slots 21. The transverse support 4 has a slot in its bottom wall in the region of its axial ends. The regions of the bottom wall having the slot therein engage slots 21 of extension 20, and thereby neck 22 of extension 20 rests within the transverse support 4. The housing 5 is fixed to the transverse support 4 by means of a fastening element, such as a screw 23, placed through the hole 19 of extension 18 and screwed into a rivet nut 37. A clamping angle 36 is also seated within the transverse support 4.

Figure 2:
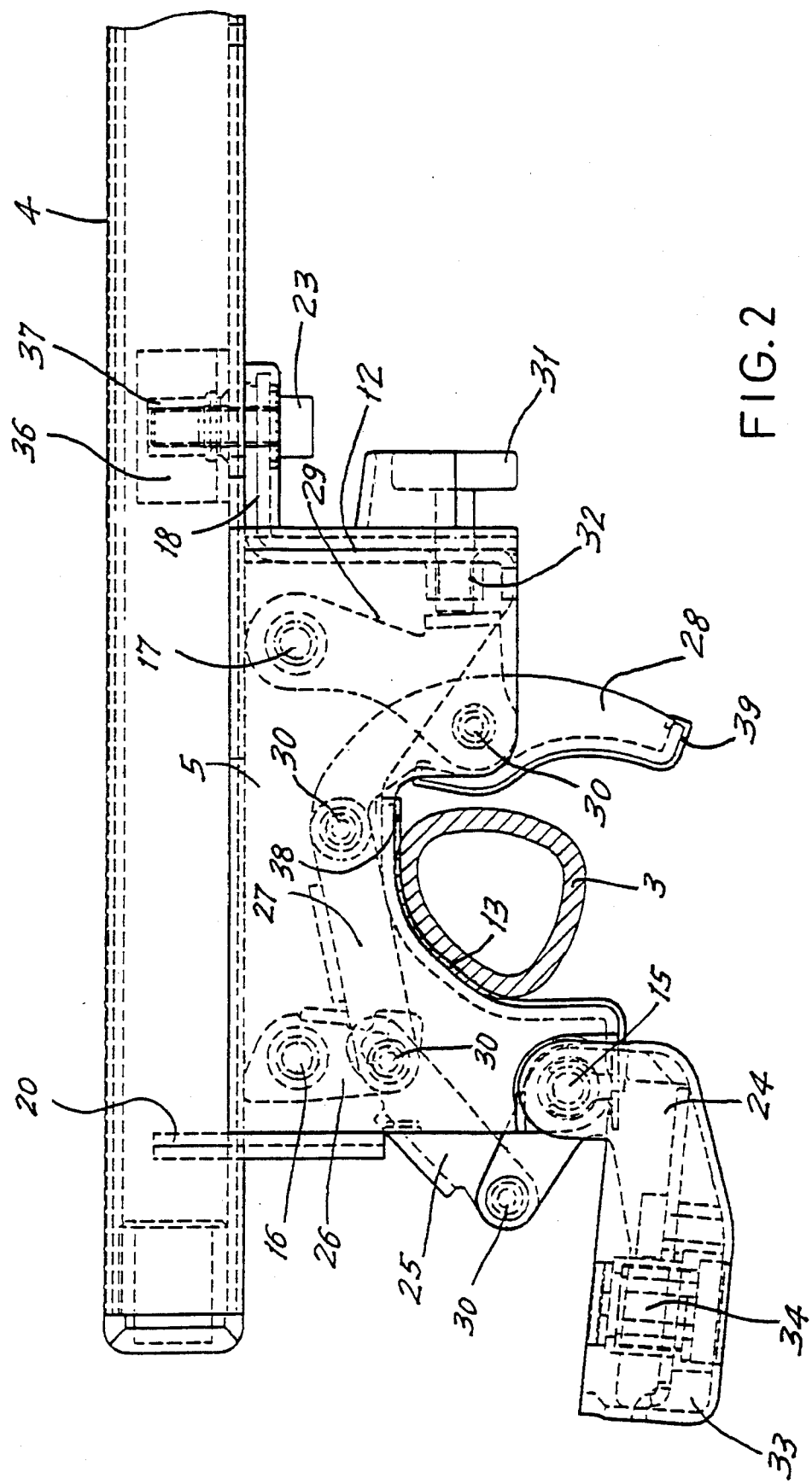
FIG. 2 is a partial cross-sectional view of an end of a transverse support with a fastening device in completely open condition placed on a railing bar.

The lever mechanism 6, seen in FIGS. 2 and 7, comprises a bell-crank lever 24 serving as a clamping lever, an intermediate lever 25, a position lever 26, a strap 27, a pivotal lower clamping jaw 28 and an adjustment lever 29. The bell-crank lever 24 is pivotable about a mounting pin 15 which is fixed in the housing 5. The intermediate lever 25 is articulated at one end via a first mounting pin 30 to the short lever arm of the bell-crank lever 24. At its other end, the intermediate lever 25 is pivoted on the one side to the position lever 26, which is pivotable about the mounting pin 16 which is fixed in the housing 5, and on the other side to the strap 27 at its end via a second mounting pin 30. The other end of the strap 27 is pivoted, via a third mounting pin 30, on the upper end of the approximately crescent-shaped lower clamping jaw 28 which, in its turn, is pivotable approximately centrally along its length about a fourth mounting pin 30. An adjustment lever 29 is also pivoted at one end to the fourth mounting pin 30 and at its other end is pivotable about the mounting pin 17 to the housing 5.

Figure 3:
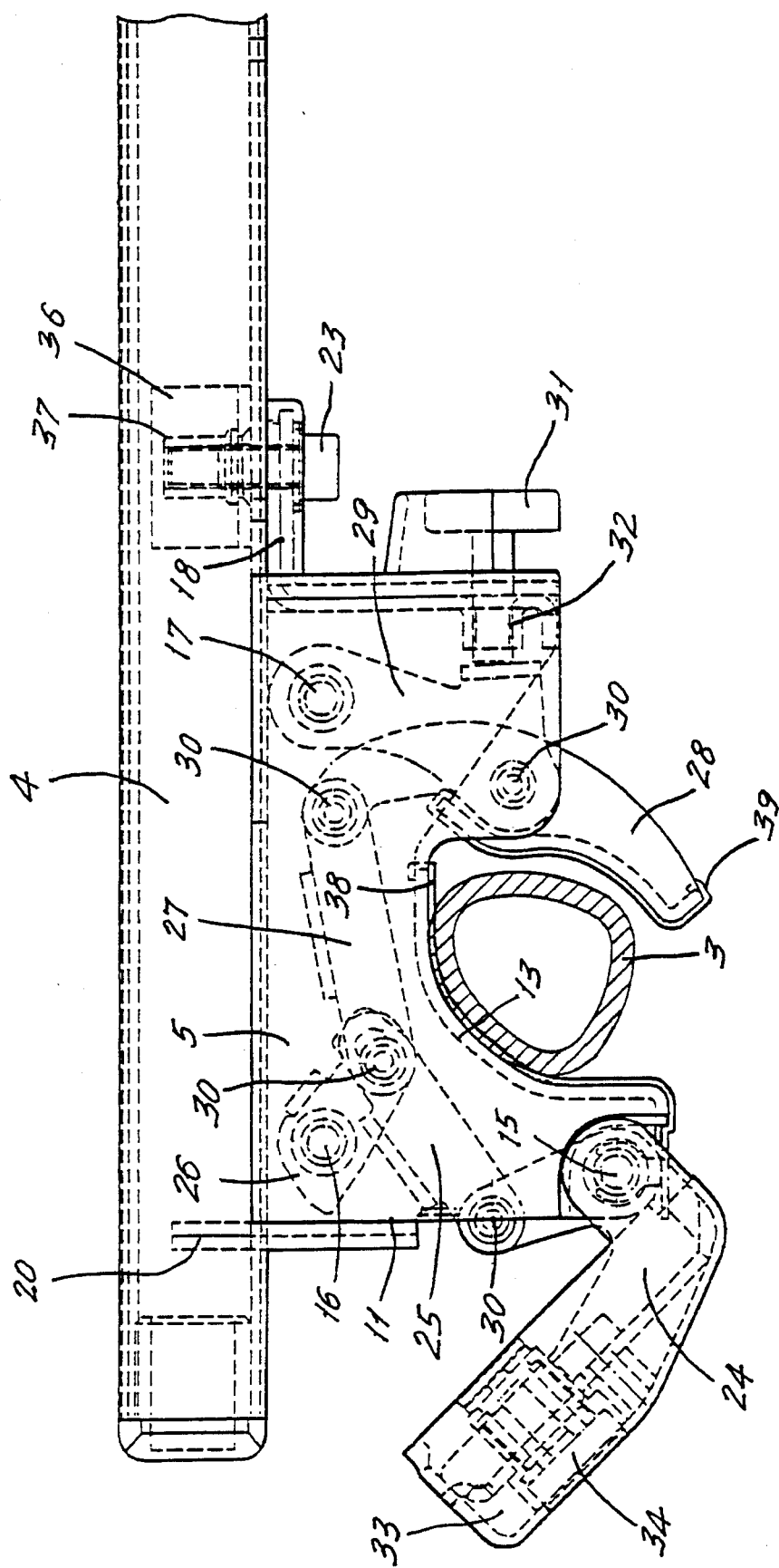
FIG. 3 is a partial cross-sectional view of the fastening device and its arrangement in accordance with FIG. 2, but in a half-open/half-closed condition.
Figure 4:
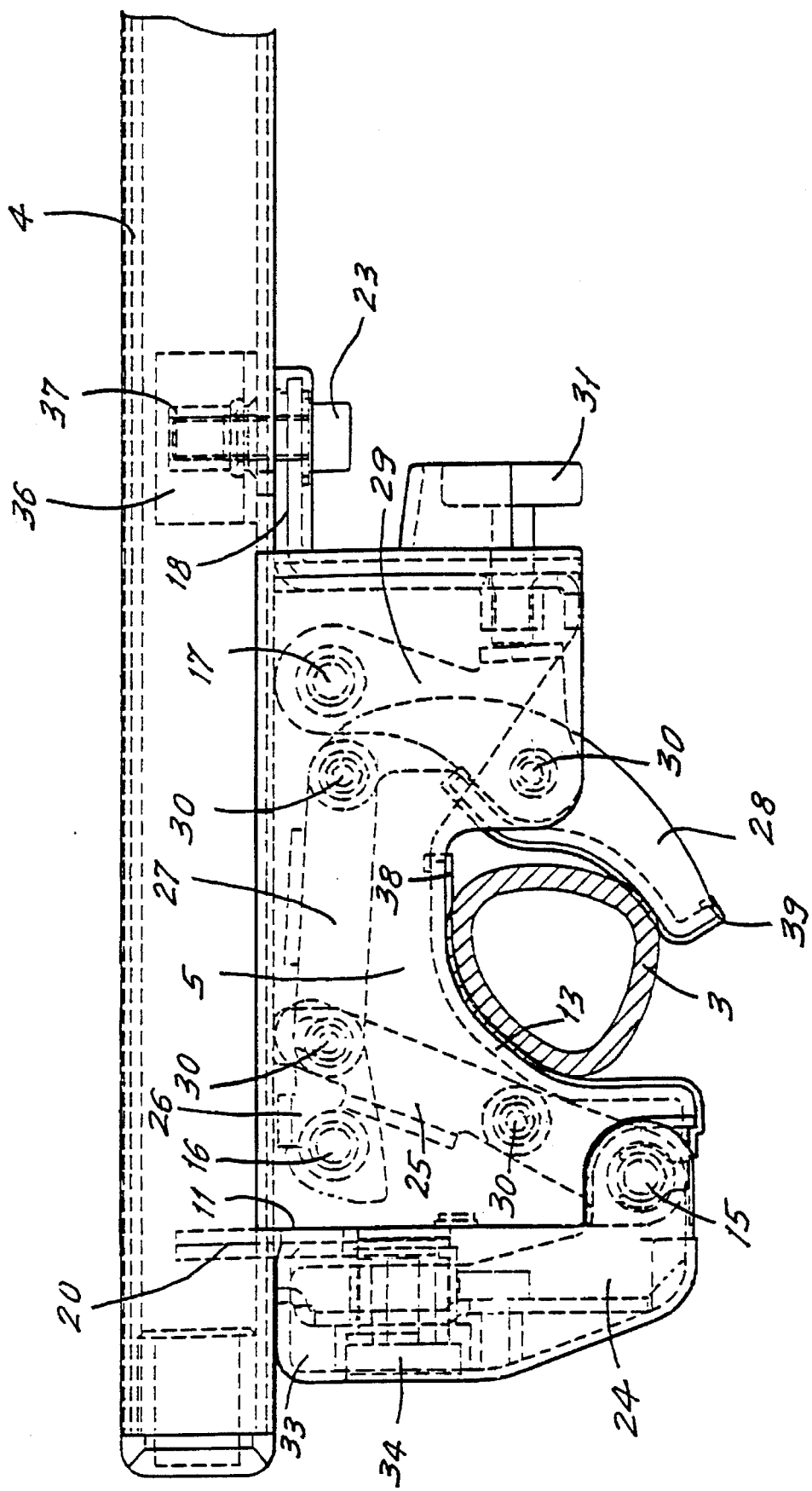
FIG. 4 is a partial cross-sectional view of the fastening device and its arrangement according to FIGS. 2 or 3, but in a completely closed, clamped condition.

For fastening a transverse support 4 to the railing bars 3, the transverse support 4 has its fastening devices attached to its two ends. The clamping jaws 13 and 28, as shown for example in FIG. 2, are wide open, when the bell-crank lever 24 is in a downward position. By the upward swinging of the clamping lever 24 out of the position shown in FIG. 2, past the position shown in FIG. 3, and up into the position shown in FIG. 4, the railing bar 3 is clamped between the clamping jaws 13 and 28, which is accomplished in an extremely rapid and reliable manner. By the upward swinging of the clamping lever 24, the first pivot pin 30 is swung on an arcuate path around the mounting pin 15, so that the second pivot pin 30 is swung on an arcuate path around the mounting pin 16, and as a result, the clamping jaw 28 is swung via the strap 27 around the fourth pivot pin 30 and is clamped against the railing bar 3. The short lever arm of the clamping lever 24, forms an elbow lever with the intermediate lever 25, as does the position lever 26 with the strap 27. The lever arms comprising these elbow levers are moved, upon the clamping of the railing bar 3, from a strongly angled position (FIGS. 2 and 3) into a position beyond dead center (FIG. 4). Unintentional loosening of the fastening device is therefore not possible.

In order to be able to clamp railing bars of different cross-sectional sizes, an adjusting device is provided by means of an adjustment lever 29, the adjusting device comprising an adjustment screw 31. The adjustment screw 31 has its threaded shaft seated in an internally threaded hole 32 which is formed in the rear wall 12 of the housing 5. The free end of the adjustment screw 31 acts on the adjustment lever 29, which can swing around the mounting pin 17, and thereby displaces the central pivot point of the lower clamping jaw 28. Thus, the clamping dimension required between the clamping jaws 13 and 28 can easily be adjusted.

The bell-crank lever 24 which forms the clamping lever is provided with a grip shell 33 which covers the front of the housing 5 and may comprise a deep-drawn sheet-metal body or of a plastic injection molded body. The grip shell 33 is rigidly attached to the bell-crank lever 24. The grip shell 33 is provided with a locking cylinder 34 with locking bolt, which can be actuated by means of a key.

Figure 5:
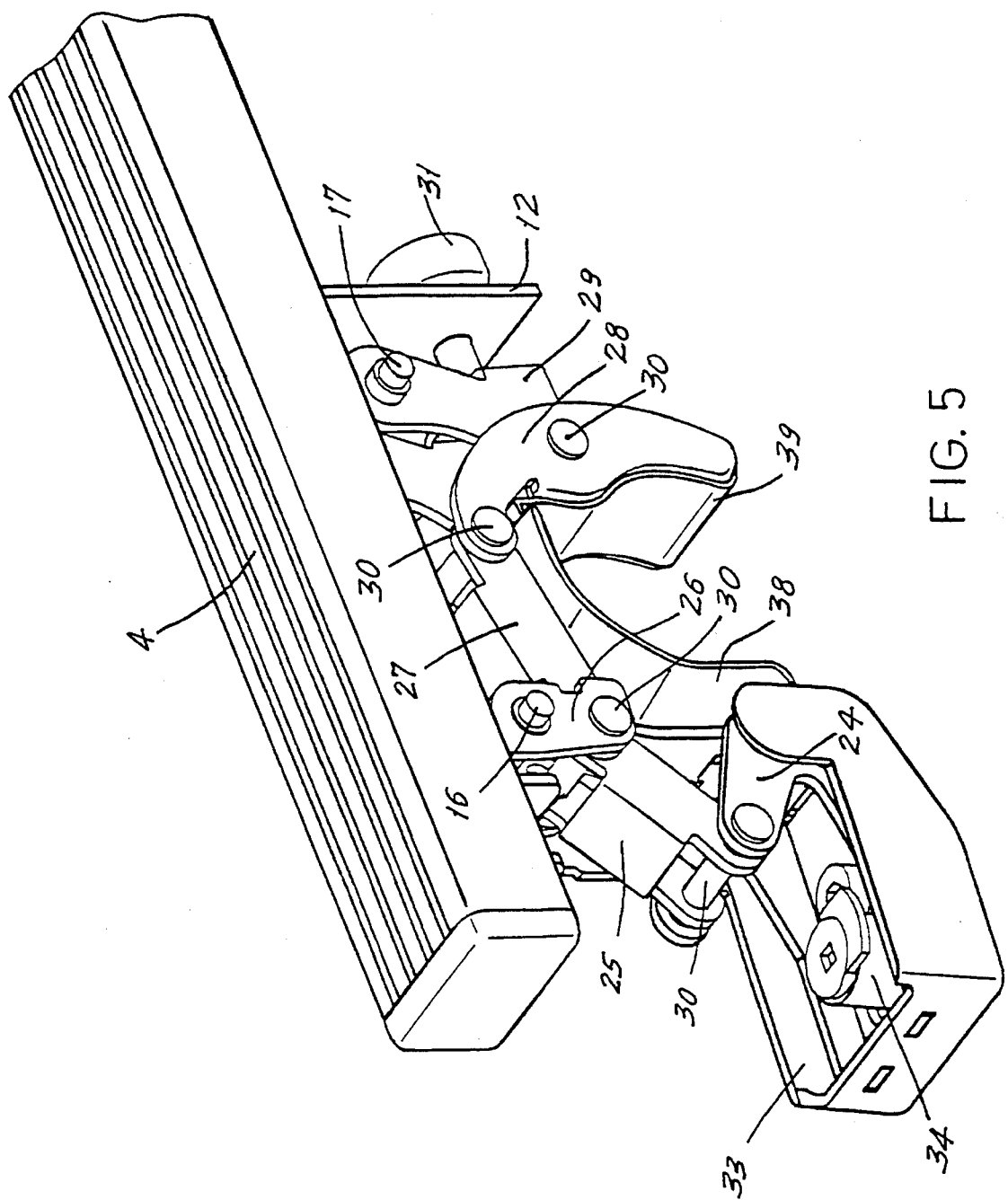
FIG. 5 is a perspective view of the fastening device with only part of the housing shown.

The individual levers of the lever mechanism preferably comprise shaped sheet-metal stampings, whereby simple and inexpensive manufacture of the fastening device is possible. Each individual lever preferably is comprised of two arms connected to each other by a web, as can be noted particularly clearly from FIGS. 5 and 7.

Figure 8:
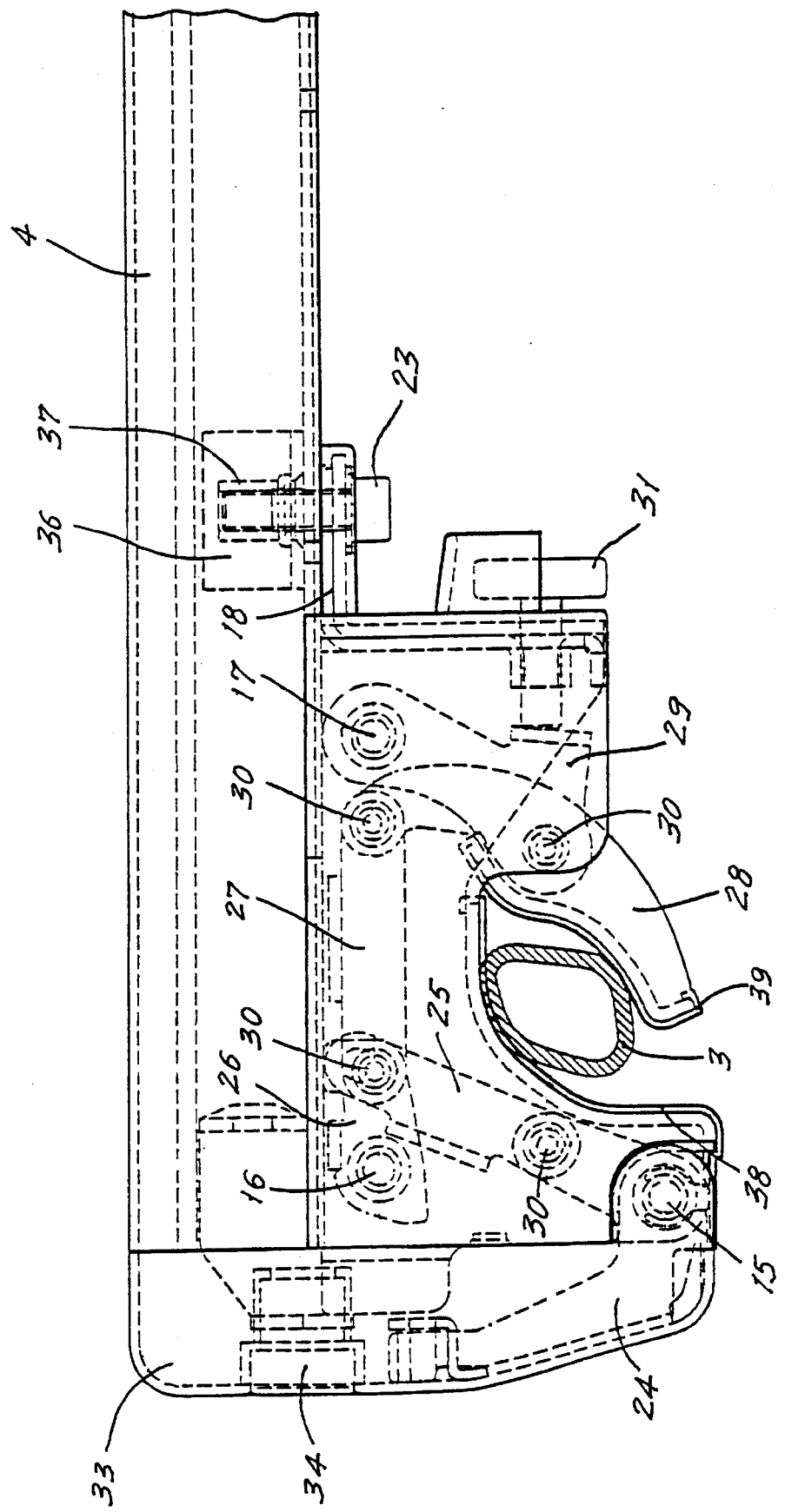
FIG. 8 illustrates the fastening device and its arrangement similar to that of FIG. 4, but of a modified embodiment.

The embodiment of the fastening device shown in FIG. 8 does not differ in its basic construction from the one described above. The only difference lies in the grip shell 33 which, in this case, is developed so that it is capable of also covering an end of the transverse support 4. FIG. 8 also shows, for instance by way of comparison with FIG. 4, that the new fast-clamp fastening device is definitely suited for use on railing bars 3 of different cross-sectional dimensions. This merely requires a greater or lesser turning of the adjustment screw 31 into the hole 32. Turning the adjustment screw 31 away from the adjustment lever 29 produces an increase in the clamping dimension, while turning the adjustment screw 31 towards the adjustment lever 29 results in a corresponding decrease in the clamping dimension.

For the sake of completeness, it should be noted that each of the clamping jaws 13 and 28 can be provided with a scratch-protection device 38, 39 in order to avoid scratching the upper surface of the railing bar 3.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A fastening device adapted to be incorporated as part of a transverse support for attachment to a railing bar of a motor vehicle roof rack, comprising:

a housing having a fixed clamping jaw capable of resting on the railing bar; and a lever mechanism mounted to said housing and including a bell-crank lever pivotally fixed in said housing and serving as a clamping lever, an intermediate lever pivotally attached at one end thereof to said bell-crank lever, a positioning lever and a strap, said intermediate lever having a pivotal connection at another end thereof to said positioning lever and said strap, said positioning lever spaced from said pivotal connection to said intermediate lever and said strap is pivotally mounted to said housing, said strap spaced from its pivotal connection to said positioning lever and said intermediate lever is pivotally connected to a lower clamping jaw disposed opposite said fixed clamping jaw, said lower clamping jaw at a position along its length being pivotally connected to an adjustment lever which is pivotally mounted to said housing, said adjustment lever capable of being pivoted about its pivotal mounting to said housing by a displacement element.

2. A fastening device according to claim 1, wherein said bell-crank lever is connected to the intermediate lever and said positioning lever is connected to said strap in the manner of an elbow lever, such that upon the pivotal motion of said bell-crank lever said levers are capable of being moved beyond an extended dead-center position.

3. A fastening device according to claim 1, further comprising a grip shell partially covering said bell-crank lever, said grip shell including a locking mechanism capable of locking said bell-crank lever in a fixed position.

4. A fastening device according to claim 3, wherein said fastening device is adapted to be fixed at the ends of said transverse support, and said grip shell has a length extending to below said end of said transverse support when said bell-crank lever is fully pivoted in an upright position toward said transverse support.

5. A fastening device according to claim 3, wherein said fastening device is adapted to be fixed at the ends of said transverse support, and said grip shell has a length for covering the end of the transverse support when said bell-crank lever is fully pivotal in an upright position toward the transverse support.

6. A fastening device according to claim 1, wherein said transverse support having a bottom wall with a longitudinal slot therein at an end of said transverse support, said housing having a rear wall opposite a front wall, said rear wall having an extension extending substantially at a right angle from said rear wall and having a hole therein adapted for accepting a fastening element, said front wall having an extension with lateral slots therein forming a neck, and said neck of said extension adapted to engage the longitudinal slot of said bottom wall of said transverse support and said rear wall extension fastened to said bottom wall by said fastening element through said hole therein, thereby said housing is attached to the bottom wall of said transverse support.

7. A fastening device according to claim 1, wherein said adjustment lever is capable of being adjusted by said displacement element such that said lower clamping jaw is displaced to a desired portion suitable for clamping said railing bar.

8. A fastening device capable of being mounted to a railing bar, comprising:

a housing having a fixed clamping jaw adapted to rest against said railing bar;

a lever mechanism fixed to said housing, said lever mechanism including, a bell-crank lever pivotally connected to said housing, an intermediate lever pivotally connected at one end thereof to said bell-crank lever, a positioning lever and a strap, said intermediate lever having a pivotal connection at another end thereof to both said positioning lever and said strap, said positioning lever opposite its pivotal connection to said intermediate lever and said strap is pivotally mounted to said housing, said strap opposite from its pivotal connection to said positioning lever and said intermediate lever is pivotally connected to a lower clamping jaw, said lower clamping jaw disposed opposite said fixed clamping jaw, an adjustment lever, said lower clamping jaw pivotally attached to said adjustment lever at a point on said lower clamping jaw spaced from its pivotal connection to said strap, a displacement element, said adjustment lever pivotally mounted to said housing and pivotable about said mounting to said housing by said displacement element, and said displacement element adapted to displace said lower clamping jaw by pivoting of said adjustment lever and thereby adjusting the clamping space between said fixed clamping jaw and said lower clamping jaw.

* * * * *